United States Patent
Azulai et al.

(10) Patent No.: US 9,749,597 B2
(45) Date of Patent: Aug. 29, 2017

(54) PRECISE TARGET POSITIONING IN GEOGRAPHICAL IMAGING

(75) Inventors: Ophir Azulai, Tivon (IL); Alexander Khazanovitch, Haifa (IL)

(73) Assignee: International Business Machines Corporation, Armonk, NY (US)

( * ) Notice: Subject to any disclaimer, the term of this patent is extended or adjusted under 35 U.S.C. 154(b) by 874 days.

(21) Appl. No.: 12/853,300

(22) Filed: Aug. 10, 2010

(65) Prior Publication Data

US 2012/0038770 A1 Feb. 16, 2012

(51) Int. Cl.
| | |
|---|---|
| *H04N 7/18* | (2006.01) |
| *G06K 9/00* | (2006.01) |
| *G01C 11/06* | (2006.01) |
| *G01C 11/00* | (2006.01) |
| *G06K 9/20* | (2006.01) |

(52) U.S. Cl.
CPC ............. *H04N 7/183* (2013.01); *G01C 11/00* (2013.01); *G01C 11/06* (2013.01); *G06K 9/0063* (2013.01); *G06K 9/209* (2013.01); *G06T 2207/10016* (2013.01); *G06T 2207/10021* (2013.01)

(58) Field of Classification Search
CPC ...... G01C 11/00; G01C 11/06; G06K 9/0063; G06K 9/209; G06K 9/00771; G06T 2207/10016; G06T 2207/10021; H04N 7/183
USPC ......................................................... 348/144
See application file for complete search history.

(56) References Cited

U.S. PATENT DOCUMENTS

| | | | |
|---|---|---|---|
| 6,597,818 B2 | 7/2003 | Kumar et al. | |
| 2002/0041328 A1* | 4/2002 | LeCompte | ........... G01C 11/025 348/144 |
| 2003/0052896 A1* | 3/2003 | Higgins | ............... G09B 29/102 345/619 |
| 2007/0027591 A1 | 2/2007 | Goldenberg et al. | |
| 2008/0240616 A1* | 10/2008 | Haering et al. | ............... 382/294 |
| 2009/0010493 A1* | 1/2009 | Gornick | ............. G06K 9/00771 382/103 |
| 2009/0087029 A1* | 4/2009 | Coleman et al. | ............. 382/103 |
| 2009/0303251 A1* | 12/2009 | Balogh | ............. G06F 17/30241 345/632 |

(Continued)

OTHER PUBLICATIONS

Yuping Lin et al., "Map-Enhanced UAV Image Sequence Registration", IEEE Workshop on Applications of Computer Vision (WACV'07), 2007. URL: http://www.docstoc.com/docs/16614361/Map-Enhanced-UAV-Image-Sequence-Registration-and-Synchronization-.

(Continued)

*Primary Examiner* — David Lazaro
*Assistant Examiner* — Xiang Yu (57) ABSTRACT

A method, system, and computer program product for precise target positioning in geographical imaging are provided. The system includes: a sensor including a camera and a telemetry information provider; and a simulated image mechanism for simulating an image of the view from the camera generated from an orthophotograph. A display displays a geographical image of a view from the camera and simultaneously displaying the simulated image. A selection component is provided for selecting a location on the simulated image. This is done by reference to a target in the geographical image. A world coordinates calculating component accurately calculates the world coordinates for the selected location from the simulated image.

21 Claims, 4 Drawing Sheets

(56) References Cited

U.S. PATENT DOCUMENTS

| | | | |
|---|---|---|---|
| 2010/0220174 A1* | 9/2010 | Mendoza et al. | 348/39 |
| 2011/0007948 A1* | 1/2011 | Oldroyd | G01C 11/00 382/106 |
| 2011/0171612 A1* | 7/2011 | Gelinske | G09B 9/08 434/35 |
| 2012/0293505 A1* | 11/2012 | Meadow et al. | 345/419 |

OTHER PUBLICATIONS

Adel Hafiane and Kannappan Palaniappan, "UAV—Video Registration Using Block-Based Features". URL: http://www.igarss08.org/Abstracts/pdfs/4041.pdf.

* cited by examiner

PRECISE TARGET POSITIONING IN GEOGRAPHICAL IMAGING

BACKGROUND

This invention relates to the field of geographical imaging. In particular, the invention relates to precise target positioning in geographical imaging.

Video is known with geographical telemetry. For example, a camera may be situated in a location with remote control in which the field of view, pitch, roll and yaw of the camera can be set from a distance. The camera is generally at a fixed height and transmits a video and the current telemetry information. Unfortunately, the geographical telemetry provided in association with such a video is not very accurate. When a user attempts to reference a geographical pixel by clicking a specific point on the video frame, the derived accuracy is not good.

BRIEF SUMMARY

According to a first aspect of the present invention there is provided a method for precise target positioning in geographical imaging, comprising: displaying a geographical image of a view from a camera; simultaneously displaying a simulated image of the view from the camera generated from an orthophotograph; receiving a selection of a location on the simulated image by reference to a target in the geographical image; and calculating accurate world coordinates for the selected location from the simulated image; wherein said steps are implemented in either: computer hardware configured to perform said identifying, tracing, and providing steps, or computer software embodied in a non-transitory, tangible, computer-readable storage medium.

According to a second aspect of the present invention there is provided a computer program product for precise target positioning in geographical imaging, the computer program product comprising: a computer readable storage medium having computer readable program code embodied therewith, the computer readable program code comprising: computer readable program code configured to: display a geographical image of a view from a camera; simultaneously display a simulated image of the view from the camera created from an orthophotograph; receive a selection of a location on the simulated image by reference to a target in the geographical image; and calculate accurate world coordinates for the selected location from the simulated image.

According to a third aspect of the present invention there is provided a system for precise target positioning in geographical imaging, comprising: a processor; a sensor including a camera and a telemetry information provider; a simulated image mechanism for simulating an image of the view from the camera generated from an orthophotograph; a graphical user interface for displaying a geographical image of a view from the camera and simultaneously displaying the simulated image; a selection receiving component for selecting a location on the simulated image by reference to a target in the geographical image; and a world coordinates calculating component for accurately calculating the world coordinates for the selected location from the simulated image.

According to a fourth aspect of the present invention there is provided a method of providing a service to a customer over a network for precise target positioning in geographical imaging, the service comprising: displaying a geographical image of a view from a camera; simultaneously displaying a simulated image of the view from the camera generated from an orthophotograph; receiving a selection of a location on the simulated image by reference to a target in the geographical image; and calculating accurate world coordinates for the selected location from the simulated image; wherein said steps are implemented in either: computer hardware configured to perform said identifying, tracing, and providing steps, or computer software embodied in a non-transitory, tangible, computer-readable storage medium.

BRIEF DESCRIPTION OF THE SEVERAL VIEWS OF THE DRAWINGS

The subject matter regarded as the invention is particularly pointed out and distinctly claimed in the concluding portion of the specification. The invention, both as to organization and method of operation, together with objects, features, and advantages thereof, may best be understood by reference to the following detailed description when read with the accompanying drawings in which:

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numbers may be repeated among the figures to indicate corresponding or analogous features.

DETAILED DESCRIPTION

In the following detailed description, numerous specific details are set forth in order to provide a thorough understanding of the invention. However, it will be understood by those skilled in the art that the present invention may be practiced without these specific details. In other instances, well-known methods, procedures, and components have not been described in detail so as not to obscure the present invention.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

A method, system and computer program product are described in which a geographical image or video is displayed of a view of a camera simultaneously with a simulated image or video of the camera view created from an orthophotograph with or without a digital terrain model (DTM). A target object or location identified in the geographical image can be identified and selected in the simulated image. Since the simulated image is created from a precise anchored orthophotograph, it is possible to calculate the precise position of the target object or location.

In this document, the term image is used to include both a stationary image and a moving image (video). The image may be live or recorded previously.

The geographical image may include still or motion pictures in analogue or digital form. For example, including television broadcasts, video camera recordings, aerial images, satellite images, images from a live feed, etc.

The geographical image may be a geographically anchored image for which telemetry information is provided in or associated with the video providing a rough indication of the location of the camera. The telemetry information may be provided in packets synchronised or un-synchronised with the video. Telemetry information may be provided for each video frame or less frequently at periodic intervals.

An orthophotograph is an aerial photograph geometrically corrected ("orthorectified") such that the scale is uniform: the photo has the same lack of distortion as a map. Unlike an uncorrected aerial photograph, an orthophotograph has uniform scale and true geometry and can be used to measure true distances, because it is an accurate representation of the Earth's surface, having been adjusted for topographic relief, lens distortion, and camera tilt.

Orthophotographs are commonly used in the creation of a Geographic Information System (GIS). Software can display the orthophotograph and allow an operator to digitize or place linework, text annotations or geographic symbols.

Orthophotographs are created by scanning aerial photographs and converting them into a raster image file format. A digital terrain model (DTM) is added as a means of collecting ground points to indicate the changes in elevation. When control points are identified on the aerial photos, stereo models are developed and geometric distortions are estimated. The image is rectified and geo-referenced using mathematical models of photogrammetry to remove tilt, terrain, atmospheric and other digital image distortions.

A DTM (also known as a digital elevation model (DEM)) is a digital representation of ground surface topography or terrain. A DTM can be represented as a raster (a grid of squares) or as a triangular irregular network. DTMs are commonly built using remote sensing techniques, but they may also be built from land surveying. DTMs are used often in geographic information systems, and are the most common basis for digitally-produced relief maps.

Figure 1:
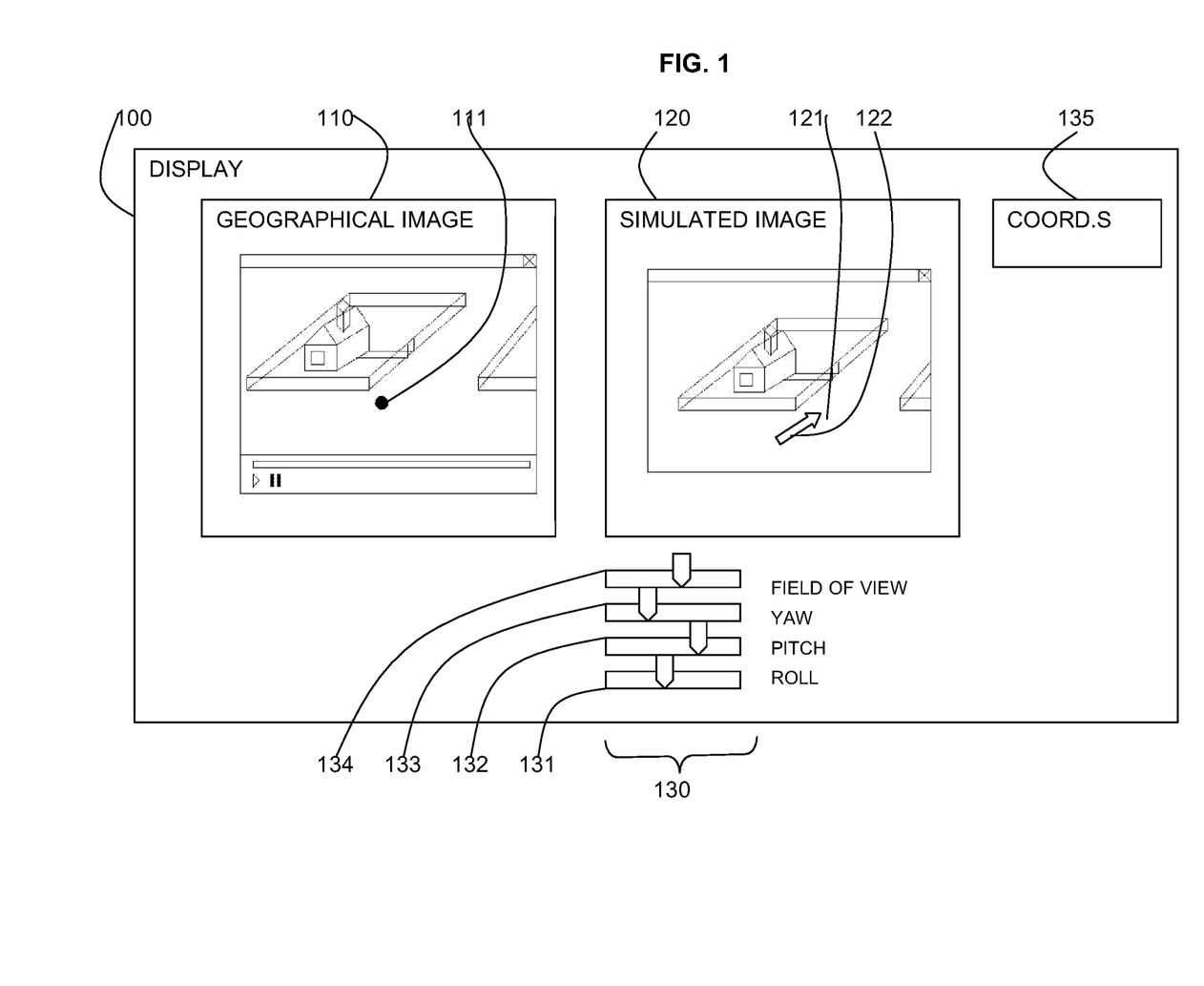
FIG. 1 is a schematic representation of a display for geographical imaging in accordance with the present invention.

Referring to FIG. 1, a schematic representation is shown of a display 100 of a geographical image 110 and a corresponding simulated image 120 of the same field of view as the geographical image 110 generated by using an orthophotograph. The simulated image 120 may be modelled as a three-dimensional graphical representation based on the orthophotograph with DTM.

A target object 111 viewed in the geographical image 110 can be manually located 121 by a user in the simulated image 120. A user selection mechanism 122 such as a pointer device selection (for example, a mouse click) can identify the target object's location 121 in the simulated image 120. As the simulated image 120 is a precise orthophotograph, an accurate world coordinate location of the target object 111 can be determined.

The simulated image 120 may be provided with graphical user interface (GUI) controls 130 to enable a user to navigate or tune the simulated image 120 with more detail and accuracy. For example, the GUI controls 130 may include a field of view delta 131, a yaw delta 132, a pitch delta 133, and a roll delta 134. The display 100 may display the calculated world coordinates 135 of a selected location as currently pointed to by the selection mechanism 122.

From the orthophotograph and DTM a three-dimensional model can be created. The system can be implemented using computer graphics techniques to provide the three-dimensional simulated image such as OpenGL (Open Graphics Library) (OpenGL is a trade mark of Silicon Graphics International) or Java3D (Java3D is a trade mark of Sun Microsystems Corporation).

The sensor (including the camera) location, height, field of view, pitch, roll and yaw are known, albeit with some inaccuracy. Therefore, the inaccurate data can be used to simulate the sensor view from the same perspective as the camera relative to the orthophotograph. When a user selects a location on the simulated image using a computer graphics' picking technique, the (x,y) coordinates of the screen are transformed to the (x,y,z) world coordinates with reference to the three-dimensional model.

Figure 2:
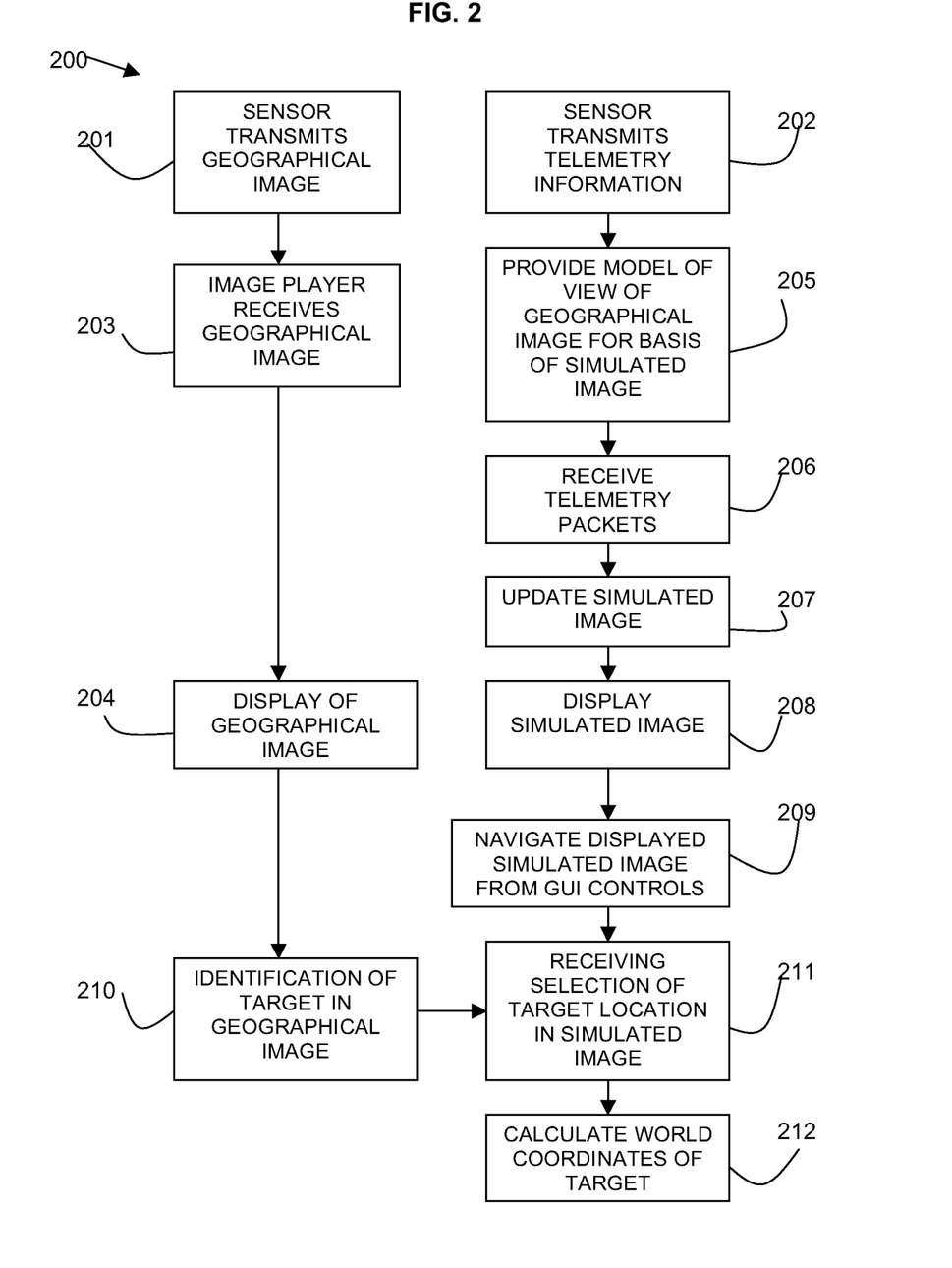
FIG. 2 is a flow diagram of a method of position location in geographical imaging in accordance with the present invention.

Referring to FIG. 2, a flow diagram 200 shows the described method.

A sensor transmits 201 a geographical image from a camera. For example, in one embodiment this may be a video in MPEG transport stream (TS) format, with user datagram protocol (UDP) over unicast or multicast. In another embodiment, this may be video over RTP (Real-time Transport Protocol).

The sensor also transmits 202 telemetry information in packets for a given time. The telemetry information may be provided periodically at time intervals during the operation of the camera at the sensor. A telemetry packet can contain the following parameters relating to the position of the sensor:

Location (longitude, latitude);
Height;
Field of view (zoom related);
Pitch;
Roll;
Yaw.

The telemetry packets can be sent by any suitable communication protocol, such as TCP (Transmission Control Protocol). In one example embodiment, each UDP packet contains the parameters which are valid for the UDP transmission time. In another embodiment, the telemetry information can be interleaved inside the MPEG transport stream as another elementary stream.

An image player receives 203 the geographical image and displays it 204. For example, this may be a video player with display and an example implementation may use Microsoft DirectShow (Microsoft and DirectShow are trade marks of Microsoft Corporation) framework.

Simultaneously, a simulated image application provides 205 a model of the view of the geographical image for the basis of a simulated image. The simulated image application receives 206 the telemetry packets and updates 207 the simulated image accordingly. The simulated image is created by placing a virtual camera inside a geometrically specified world. The camera "captures" the view from its current location, orientation, and perspective. The visualization system then draws that view as the simulated sensor view. On receiving each telemetry packet, the application changes the view by moving the virtual camera to a new location, by changing its orientation and by changing its field of view according to the received parameters in order to continually reflect the geographical view of the sensor.

The updated simulated image is displayed 208 in parallel with the display 204 of the geographical image. The simulated image display 208 includes GUI controls for user navigation of the display. In one embodiment, implementation of the simulated image application is by using ESRI ArcGIS Engine with 3D extension (ESRI and ArcGIS are trade marks of ESRI).

Navigation 209 of the displayed simulated image is made from the GUI controls' inputs, for example, by increasing/decreasing the field of view, moving to the right/left or up/down, increasing/decreasing the yaw/pitch/roll parameters, etc.

A user viewing the simultaneous displays of the geographical image and the simulated image of the same view can identify 210 a target object in the geographical image and select it in the simulated image. A selection of the target object's corresponding location in the simulated image is received 211 from the user's input. This can be done even if an object is not shown in the simulated image or is unclear, by using other points of reference in the images.

A user can use a selection mechanism such as a pointer device to select a location in the simulated sensor view in the form of a point (x,y). The point may reside at a single point, or in an object, an area, or a line in the simulated sensor view. Picking technology is used 212 to accurately calculate the world coordinates of the selected location of the simulated sensor view.

Figure 3:
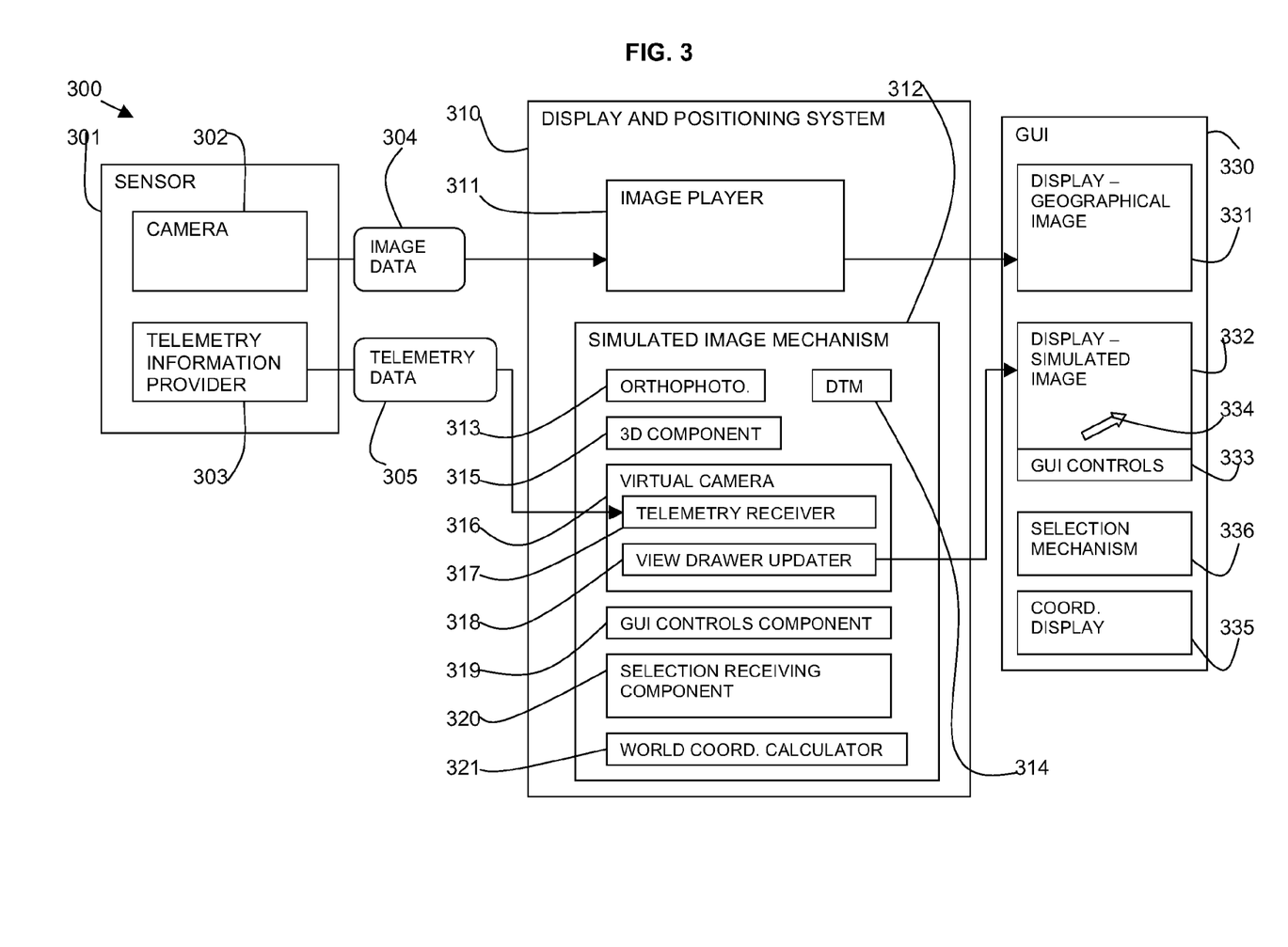
FIG. 3 is a block diagram of a system in accordance with the present invention.

Referring to FIG. 3, a block diagram shows an embodiment of the described system 300. A sensor 301 includes a camera 302 for collecting an image at a geographical field. The sensor 301 also includes a telemetry information provider 303 for providing telemetry information regarding the position of the camera. For example, the telemetry information may include: location (longitude, latitude), height, field of view (zoom related), pitch, roll, yaw.

The sensor 301 transmits the image data 304 and the telemetry data 305 to a display and positioning system 310.

The display and positioning system 310 includes a camera image receiver and image player 311 for displaying on a display 331 of a GUI 330 the geographical image of the camera 302.

The display and positioning system 310 includes a simulated image mechanism 312 which references an orthophotograph 313 with DTM 314 to provide a simulated image. A 3D component 315 enables the visualization of the image in 3D.

The simulated image mechanism 312 includes a virtual camera 316 for capturing a view in the 3D visualization of the simulated sensor view at the same perspective as the camera 302 in the sensor 301. The virtual camera 316 includes a telemetry receiver 317 for receiving the telemetry data 305 as it is updated from the sensor 301 and a view drawer updater 318 for updating the virtual camera 316 and the simulated sensor image.

The simulated image mechanism 312 also includes a GUI controls component 319 for enabling user control of a GUI 330 display 332 of the simulated sensor image using GUI controls 333 for fine tuning the image display.

The simulated image mechanism 312 also includes a selection receiving component 320 for receiving an input at the simulated image mechanism 312 of a location selected by a user by operation of a pointer device 334 of the GUI 330 and selection mechanism 336 (such as a mouse button, or other input mechanism) to select a location in the display 332 of the simulated sensor view. The location is a point which may reside at a point, or in an object, a line, or an area corresponding to a target object viewed in the displayed geographical view of the camera.

The simulated image mechanism 312 also includes a world coordinate calculator 321 for calculating the accurate 3D world coordinates from the selected location of the display 332 of the simulated image. The world coordinates are displayed 335 in the GUI 330 for the selected location or object.

In an example embodiment, the simulated image mechanism 312 is implemented as a software application as a GIS SDK tool, for example using ESRI ArcGIS Engine-3D extension (ESRI and ArcGIS are trade marks of ESRI). ArcGIS Engine is a collection of GIS components and developer resources that can be embedded with 3D extension enables the visualization of data in 3D. The controls for SceneControl and GlobeControl provide the interface with multiple layers of 3D and global data for visualizing data and creating and analyzing surfaces.

ArcGIS supports data from standard formats including TIFF (tagged image file format), BIL image file, IMG file format, USGS DEM (United States Geographical Survey Digital Elevation Model) file format, SDTS (Spatial Data Transfer Standard), DTED (Digital Terrain Elevation Data), and many others. Orthophotographs are usually stored in the Geo-TIFF format with DEM usually stored in USGS DEM or DTED.

Location selection, also referred to as picking, in a three-dimensional view such as the simulated image is the technique for selecting a point on a display and translating it to a three-dimensional point on a surface. As the coordinates of the surface are known, it is straightforward to convert the three-dimensional point to a world coordinate.

Object picking is carried out any time mouseover feedback is generated in a scene or a drag operation is performed. In a 3D user interface, picking is the process of translating the 2D mouse position on the display screen into an in-scene object selection, a hit, and optionally the 3D position of the hit on the object. The process requires casting a ray into the scene through the mouse position and determining which objects, if any, are hit.

Picking, in Java3D, is a process supported by a number of cooperating classes. Picking occurs in several stages, with the earlier stages getting close, and the later stages providing spatial precision to the hit determination. The following is an overview of the full precision process:

Throw a pick ray from the user's virtual eyeball, through the mouse position in the view's display plane, and on into the scene.

Intersect the pick ray with the bounds surrounding the shape objects in the scene, sorting the hits from closest to farthest.

Test each hit candidate, starting with the closest, for intersection between the pick ray and the candidate's actual geometric shape (defined by a geometry array).

If no shape is hit, or the hit object owning the shape is not a designated target object, quit the process without a real hit.

Determine the hit point on the hit object using the distance of the hit ray to the point of intersection.

In an example embodiment, an ESRI API for picking is used for selection of a displayed location.

Interface ISceneGraph for ArcGIS.analyst3D—"locate" is used to locate a single object:
void locate (ISceneViewer pViewer,
    int x,
    int y,
    int mode,
    boolean bGetTransformed,
    IPoint[ ] ppPt,
    Object[ ] ppOwner,
    Object[ ] ppObject)
    Throws IOException,
        AutomationException
Parameters:
pViewer—A reference to "ArcGIS, analyst3D, ISceneViewer" (in);
x—The x (in);
y—The y (in);
mode—A "ArcGIS, analyst3D, ScenePickMode" constant (in);
bGetTransformed—The bGetTransformed (in);
ppPt—A reference to a "ArcGIS, geometry, IPoint" (out: use single element array);
ppOwner—A reference to another Object (IUnknown) (out: use single element array);
ppObject—A reference to another Object (IUnknown) (out: use single element array).
Throws:
IOException—If there are interop problems.
AutomationException—If the ArcObject component throws an exception.

Interface IPoint of ArcGIS.geometry provides access to members that define two dimensional points.

The following is example code from Java3D for converting the (x,y) coordinates to a three-dimensional point.

```
private Point3d calculatePickLocation(int x, int y) {
    if (box == null) {
        return null;
    }
    Point3d eye_pos = new Point3d( );
    Point3d mouse_pos = new Point3d( );
    canvas.getCenterEyeInImagePlate(eye_pos);
    canvas.getPixelLocationInImagePlate(x, y, mouse_pos);
    Transform3D motion = new Transform3D( );
    canvas.getImagePlateToVworld(motion);
    motion.transform(eye_pos);
    motion.transform(mouse_pos);
    Vector3d direction = new Vector3d(mouse_pos);
    direction.sub(eye_pos);
    PickRay ray = new PickRay(eye_pos, direction);
    PickTool tool = new PickTool(box.getShape(4).getLocale( ));
    tool.setShape(ray, eye_pos);
    tool.setMode(PickTool.GEOMETRY_INTERSECT_INFO);
    PickResult[ ] s = tool.pickAll( );
    try {
        Point3d                     coords3d
        s[0].getIntersection(0).getPointCoordinates( );
        return coords3d;
```

```
    } catch (Exception es) {
        for (Player3dModelListener listener : listeners) {
            listener.pickNotOnTheMap( );
        }
    }
    return null;
}
```

Figure 4:
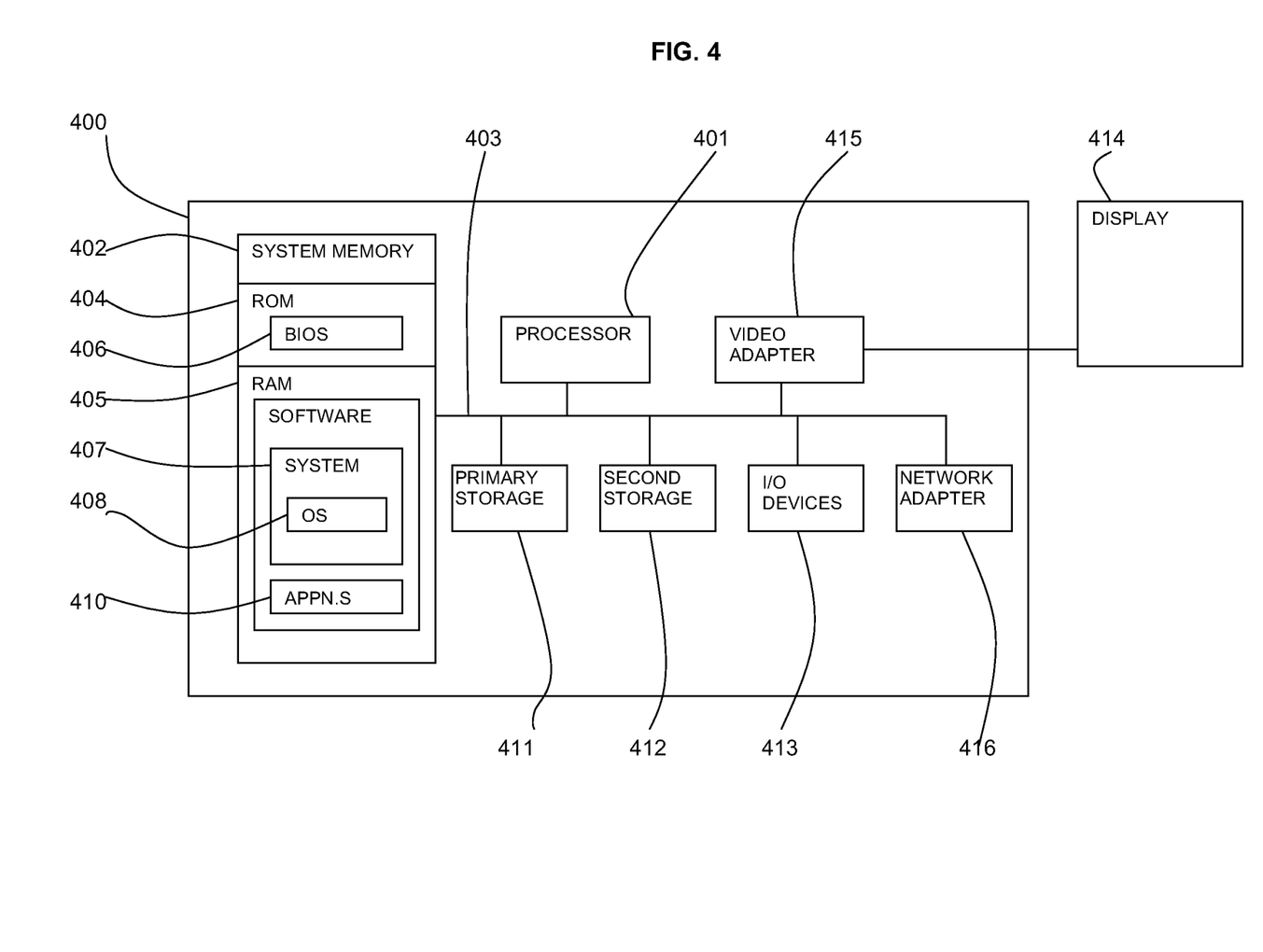
FIG. 4 is a block diagram of a computer system in which the present invention may be implemented.

Referring to FIG. 4, an exemplary system for implementing aspects of the invention includes a data processing system 400 suitable for storing and/or executing program code including at least one processor 401 coupled directly or indirectly to memory elements through a bus system 403. The memory elements can include local memory employed during actual execution of the program code, bulk storage, and cache memories which provide temporary storage of at least some program code in order to reduce the number of times code must be retrieved from bulk storage during execution.

The memory elements may include system memory 402 in the form of read only memory (ROM) 404 and random access memory (RAM) 405. A basic input/output system (BIOS) 406 may be stored in ROM 404. System software 407 may be stored in RAM 405 including operating system software 408. Software applications 410 may also be stored in RAM 405.

The system 400 may also include a primary storage means 411 such as a magnetic hard disk drive and secondary storage means 412 such as a magnetic disc drive and an optical disc drive. The drives and their associated computer-readable media provide non-volatile storage of computer-executable instructions, data structures, program modules and other data for the system 400. Software applications may be stored on the primary and secondary storage means 411, 412 as well as the system memory 402.

The computing system 400 may operate in a networked environment using logical connections to one or more remote computers via a network adapter 416.

Input/output devices 413 can be coupled to the system either directly or through intervening I/O controllers. A user may enter commands and information into the system 400 through input devices such as a keyboard, pointing device, or other input devices (for example, microphone, joy stick, game pad, satellite dish, scanner, or the like). Output devices may include speakers, printers, etc. A display device 414 is also connected to system bus 403 via an interface, such as video adapter 415.

A display and positioning system for precise target positioning in geographical imaging or a simulated image mechanism may be provided as a service to a customer over a network.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A method for precise target positioning in geographical imaging, comprising:

displaying, on a first display area, a geographical image of a view of a target captured by a camera positioned at a geographical location with determinable coordinates;

at the same time as displaying the geographical image, displaying on a second display area distinct of the first display area and viewable to a user together with the first display area, a simulated image of the view captured by the camera based on a real-time data feed that provides information about the position of the camera at the geographic location according to information captured by a sensor located at the geographic location, wherein an orthophotograph of the area that includes the target is used to generate the simulated image;

in response to user interaction with a pointing device, receiving a selection of a location on the simulated image by way of pointing device referencing a point on the simulated image, where the reference point on the simulated image correlates to the location of the target in the geographical image, wherein the user, based on viewing the geographic image and the simulated image together, is capable of using the pointing device to select a point on the simulated image that corresponds to location of the target as displayed in the geographic image;

calculating world coordinates for the selected location from the simulated image using a picking process to transform the coordinates of the display area of the simulated image to the world coordinates with reference to a three-dimensional model based on the orthophotograp;

wherein the picking process comprises:
throwing a pick ray from a virtual point of view of the user, through selected location on the simulated image and on into the scene;
intersecting the pick ray with bounds surrounding shape objects in the scene,
sorting the intersection hits from closest to farthest;
testing each intersection hit candidate, starting with the closest, for intersection between the pick ray and the candidate's actual geometric shape as defined by a geometry array; and
determining a hit point on the hit object using the distance of the hit ray to the point of intersection.

2. The method as claimed in claim 1, wherein the target in the geographical image is not shown in the simulated image and the selection of the location of the target is made from the surrounding context of the simulated image compared to the geographical image.

3. The method as claimed in claim 1, including:
generating the simulated image from an orthophotograph and a digital terrain model.

4. The method as claimed in claim 1, wherein the simulated image is a three-dimensional simulation of the view from the camera.

5. The method as claimed in claim 1, including:
receiving an image from the camera at a given location; and
receiving telemetry information relating to the location of the camera, wherein the simulated image is generated based on the telemetry information captured by the sensor, wherein the telemetry information is transmitted from the sensor to a simulated image application configured to render the simulated image.

6. The method as claimed in claim 5, wherein the simulated image is updated with the telemetry information to provide a simulation of the view from the camera.

7. The method as claimed in claim 5, wherein the telemetry information includes one or more of the group of: location, height, field of view, pitch, roll, and yaw.

8. The method as claimed in claim 1, including:
navigating the displayed simulated image using graphical user interface controls to view a location of a target.

9. The method as claimed in claim 1, wherein the geographical image and the simulated image are video images.

10. The method as claimed in claim 1, wherein the selected location is a point which resides in or at one of the group of: a point, an object, an area, a line.

11. The method as claimed in claim 1, wherein the simulated image simulates the geographical image as if being captured from the same location, orientation and field of view of the camera, as obtained from the real-time data feed, wherein the real-time data feed comprises inaccurate information.

12. A computer program product for precise target positioning in geographical imaging, the computer program product comprising logic code embedded in a tangible data storage medium, wherein execution of the logic code on a computer cause the computer to:
display, on a first display area, a geographical image of a view of a target captured by a camera positioned at a geographical location with determinable coordinates;
at the same time as displaying the geographical image, displaying on a second display area distinct of the first display area and viewable to a user together with the first display area, a simulated image of the view captured by the camera based on a real-time data feed that provides information about the position of the camera at the geographic location according to information captured by a sensor located at the geographic location, wherein an orthophotograph of the area that includes the target is used to generate the simulated image;
receiving, in response to user interaction with a pointing device, a selection of a location on the simulated image by way of pointing device referencing a point on the simulated image, where the reference point on the simulated image correlates to the location of the target in the geographical image, wherein the user, based on viewing the geographic image and the simulated image together, is capable of using the pointing device to select a point on the simulated image that corresponds to location of the target as displayed in the geographic image;
calculate world coordinates for the selected location from the simulated image using a picking process to transform the coordinates of the display area of the simulated image to the world coordinates with reference to a three-dimensional model based on the orthophotograph;
wherein the picking process comprises:
throwing a pick ray from a virtual point of view of the user, through selected location on the simulated image and on into the scene;
intersecting the pick ray with bounds surrounding shape objects in the scene,
sorting the intersection hits from closest to farthest;
testing each intersection hit candidate, starting with the closest, for intersection between the pick ray and the candidate's actual geometric shape as defined by a geometry array; and
determining a hit point on the hit object using the distance of the hit ray to the point of intersection.

13. A system for precise target positioning in geographical imaging, the system comprising:
one or more processors for processing imaging data;
a logic unit to display, on a first display area, a geographical image of a view of a target captured by a camera positioned at a geographical location with determinable coordinates;
a logic unit to display at the same time as displaying the geographical image, on a second display area distinct of the first display area and viewable to a user together with the first display area, a simulated image of the view captured by the camera based on a real-time data feed that provides information about the position of the camera at the geographic location according to information captured by a sensor located at the geographic location, wherein an orthophotograph of the area that includes the target is used to generate the simulated image;
a logic unit to receive, in response to user interaction with a pointing device, a selection of a location on the simulated image by way of pointing device referencing a point on the simulated image, where the reference point on the simulated image correlates to the location of the target in the geographical image, wherein the user, based on viewing the geographic image and the simulated image together, is capable of using the pointing device to select a point on the simulated image that corresponds to location of the target as displayed in the geographic image;

a logic unit to calculate world coordinates for the selected location from the simulated image using a picking process to transform the coordinates of the display area of the simulated image to the world coordinates with reference to a three-dimensional model based on the orthophotograph;

wherein the picking process comprises:
throwing a pick ray from a virtual point of view of the user, through selected location on the simulated image and on into the scene;
intersecting the pick ray with bounds surrounding shape objects in the scene,
sorting the intersection hits from closest to farthest;
testing each intersection hit candidate, starting with the closest, for intersection between the pick ray and the candidate's actual geometric shape as defined by a geometry array; and
determining a hit point on the hit object using the distance of the hit ray to the point of intersection.

14. The system as claimed in claim 13, wherein the simulated image mechanism generates the simulated image from an orthophotograph and a digital terrain model.

15. The system as claimed in claim 13, wherein the simulated image mechanism includes a three-dimensional component which generates a three-dimensional simulation of the view from the camera.

16. The system as claimed in claim 13, including:
a camera image receiver for receiving an image from the camera at a given location; and
a telemetry information receiver for receiving telemetry information relating to the location of the camera, wherein the simulated image is generated based on the telemetry information captured by the sensor, wherein the telemetry information is transmitted from the sensor to a simulated image application configured to render the simulated image.

17. The system as claimed in claim 16, wherein the simulated image mechanism includes a virtual camera updated with the telemetry information to provide a simulation of the view from the real camera.

18. The system as claimed in claim 16, wherein the telemetry information includes one or more of the group of: location, height, field of view, pitch, roll, and yaw.

19. The system as claimed in claim 13, including:
graphical user interface controls for navigating the displayed simulated image to view a location for selection.

20. The system as claimed in claim 13, wherein the geographical image and the simulated image are video images.

21. The system as claimed in claim 13, wherein the selected location is a point which resides in or at one of the group of: a point, an object, an area, or a line.

* * * * *